United States Patent [19]

Schumacher, II et al.

[11] Patent Number: 5,588,912
[45] Date of Patent: Dec. 31, 1996

[54] SIEVE FOR HARVESTING MACHINES

[76] Inventors: Gustav Schumacher, II, Gartenstrasse 8; Friedrich W. Schumacher, Goldwiese 22, both of 57612 Eichelhardt, Germany

[21] Appl. No.: 499,768

[22] Filed: Jul. 7, 1995

[30] Foreign Application Priority Data

Jul. 13, 1994 [DE] Germany ........................ 44 24 383.9

[51] Int. Cl.⁶ .................................................. A01F 12/32
[52] U.S. Cl. .................................................. 460/101
[58] Field of Search ........................ 460/101, 10, 85, 460/92, 93, 102

[56] References Cited

U.S. PATENT DOCUMENTS 1,200,002  10/1916  McGraw ........................ 460/92 X
5,041,059  8/1991  Ricketts et al. ........................ 460/101
5,085,616  2/1992  Matousek et al. ................ 460/101 X
5,176,574  1/1993  Matousek et al. ................ 460/101 X

*Primary Examiner*—Terry Lee Melius
*Attorney, Agent, or Firm*—Helfgott & Karas, P.C.

[57] ABSTRACT

A sieve for separating grain crops from a chaff-straw mixture, used in agricultural harvesting machines, particularly harvester threshers and which is passed from below by a blower wind current includes alternating elongated grooves and channels aligned in parallel relative to the crop conveying direction. The grooves and channels are alternately open on the top or on the bottom, respectively, and have lateral legs with openings, through which the crop can pass from the grooves open on the top to the channels open on the bottom.

21 Claims, 3 Drawing Sheets

SIEVE FOR HARVESTING MACHINES

The present invention relates to a sieve for grains or agricultural crops employed in agricultural harvesting machines, particularly harvester threshers.

In the cleaning equipment of a harvester thresher, it is preferred to use adjustable lamellar sieves. In this kind of sieves, the setting angle of the lamellae may be adjusted depending on the kind of the harvested crop. The sieves and hence also the lamellae are passed from below by the air current from a blower in the transporting direction of the crop to be cleaned. The sieves themselves are moved in the well-known vibratory transportation mode and convey the crop to be cleaned into the direction of the wind current.

Except for the simple flat hole sieves, the lamellae and also the noses of the prior art nose sieves are so arranged that the agricultural crops separated from the grain-and-chaff mixture to be cleaned, contrary to the wind and transport direction, fall downward through the openings and hence through the sieve into the collector from where they are conveyed to the grain tank.

Modern large harvester threshers include very aggressive threshing equipment. The latter not only disengage the grains from the stalks but also very heavily comminute the stalks. Thereby a very large amount of short straw is accumulated, constituting a heavy strain on the sieves.

These short straw stalks have the disadvantage that when they have longitudinally aligned in the conveying direction, it is only their cross section which acts as an area of attack to the blower wind. In the same manner as the grains, they then penetrate contrary to the conveying direction into the lamellae or the noses of nose sieves and thus glide through the sieve and pollute the harvested crop instead of being maintained by the wind current over the lamellae, or the noses, respectively, and then blown out at the back of the machine.

Most of the machines include two sieves disposed one upon the other which convey the crop to be cleaned in accordance with the vibrating conveyor principle, in the same direction or in counter direction, to the rear. The upper sieve, as the chaff sieve has the aim to convey the chaff and the straw particles in connection with the blower wind to the rear, and the lower sieve is expected to separate the remaining impurities. Longer stalks, however, sticking through the upper sieve also stick into the lower sieve before they have left the upper sieve. These stalks then clamp fast and disturb the blower wind. A chain reaction occurs which jams both sieves.

For the separation of undersize and small seed constituents from grains, sieves have been known comprising channels aligned in parallel relative to the crop conveying direction in the bottoms of which the channels open on top are provided with smaller, or tighter, respectively, openings or slots through which the weed seeds and the waste grains undesired in the crop are sieved out.

Such sieves have been known from GDR Patent Specification No. 216,174 A1. Nonetheless, such sieves cannot solve the problem since the short straw stalks longitudinally entering the channels may penetrate into the slots unhindered.

It is, therefore, the aim of the present invention to provide a sieve which effectively separates grains and straw constituents from each other while the straw does not penetrate into the openings provided for the passage of the harvested good but is rather effectively transported out of the machine.

This problem is solved by a sieve for harvesting machines, such as for instance a harvester thresher for separating grain crops from a chaff-straw mixture which is passed by a blower wind current from below and which includes grooves or channels aligned in parallel, or approximately in parallel, relative to the crop conveying direction, which are alternately open on the top or open on the bottom and which is characterized in that openings are provided at the lateral legs of the grooves, or channels, through which the harvested crop can travel from the grooves open on the top to the channels open on the bottom.

In case of the grooves aligned in the crop conveying direction open on the top, the crop falls into these grooves while through the neighboring channels open on the bottom, the wind current of the blower wind is passed which then can pass through openings in the legs from the air channel into the grooves open on the top. The blower wind does not, therefore, mainly act onto the crop to be cleaned from below but rather from the side. Depending on the crop to be cleaned, the lateral openings can be formed in various shapes and sizes.

The ribs between the individual openings are provided at a determined angle relative to the crop conveying direction so that the wind current in the groove open on the top, which in the following will be referred to as the grain groove, is reoriented again in the crop conveying direction. In this way, the lighter straw and chaff particles mixed with the harvested crop are pressed rearwardly out of the machine while the more compact and hence specifically heavier grains pass laterally through the openings in the groove legs and drop downwardly from the sieve.

The legs of the grooves are preferably disposed at right angles, i.e. perpendicularly to the sieve plane. In specific cases, however, these legs can also be adjusted above or also below 90° relative to the sieve plane. In one case, the grain grooves open on the top are then broader on top than on the groove bottom, in the other case, the grooves are tighter on top than on the groove bottom.

The complete sieve can very inexpensively be shaped from a one-piece metal sheet plate or from a plastic material. In the manufacture it has shown to be particularly advantageous if the individual channels and grooves are assembled from profiled parts to make a sieve. By means of identical profile parts, the sieves can be adapted, by this procedure, without any problems to the various sieve sizes.

In order to vary in a sidle way the size of the openings provided in the groove legs, which may be necessary in case of frequently changing kinds of crops, it has shown to be particularly advantageous if the sieve is assembled from U-shaped profiles each of which having openings in identical spacing and size in the flanks thereof. If the openings are congruently aside to each other, they have the largest possible passage for the blower wind on one side and the harvested crop, on the other.

If the individual channels are alternately shifted in a one to one ratio relative to each other, the openings of one channel are masked to a certain amount by the intermediate ribs of the neighboring channel and thus become smaller. If the openings and the ribs are about the same size, it is possible to completely close all openings if one channel is shifted for a corresponding distance relative to the neighboring channel.

In case of sieves made from one piece, the same effect can be obtained if a second sieve bottom having a profile form-lockingly adapted to a first sieve bottom is provided. If the two profile bottoms are then shifted relative to each other, the openings in the flanks are also reduced as soon as, by the shifting, the openings are no longer congruently one upon the other.

In case of sieves assembled from individual channels, the channels to be moved are connected to a central shifter device so that all these channels can be moved by means of one single shifter mechanism.

In the grain grooves open on the top, oblique-directed baffle plates are suitably provided preventing that the harvested crop is pushed too fast rearwardly by the blower wind in the longitudinal direction and is packed up. These baffle plates provide at the same time that the blower wind passing through the grooves in the crop conveying direction is routed obliquely upwardly and rearwardly and in this way keeps the lighter chaff particles, so to say, above the sieve. Such baffle plates may cover either the complete width of the grooves or only portion of this width.

In place of, or in combination with, the above mentioned baffle plates, spring bars may furtheron be provided in the grain grooves. In view of the sieve vibrations, these bars elastically move independently and disintegrate the finer mixture of grains and green stuff which might not be maintained by the wind current above the "ribs" of the air channels.

Such auto-elastic spring bars installed on the "ribs" of the wind channels add furtheron to the disintegration of the chaff-straw mixture if a closed mat of such mixture has formed on the sieve. Such spring bars may be distributed over the whole surface of the complete sieve area or only partially on a specific area of the sieve.

In case of a large amount of chaff, it has proved to be of advantage if in the "ribs" of the wind channels open on the bottom, obliquely rearward-directed air outlet openings are provided. Such outlets can be shaped as slots but also as nose sieve like openings simply punched out from the metal.

For disintegrating the harvested crop in the grooves, it might be suitable if in the bottoms of the grooves such air exit slots are provided as well.

In the following, the invention will be explained in more detail based on exemplified embodiments shown in the drawings wherein FIG. 1 is the cross section through a sieve according to the invention having alternately grooves open on top and channels open on the bottom., FIG. 2 is a top view of the sieve;

The embodiments of the individual profiles according to FIGS. 4 through 8 constitute exemplified embodiments. A combination of individual kinds and shapes of profiles is of course possible. Individual profiles may also be connected with one another or hooked into one another by means of covers. There exist a plurality of varieties which are known to those versed in the art.

Figure 1:
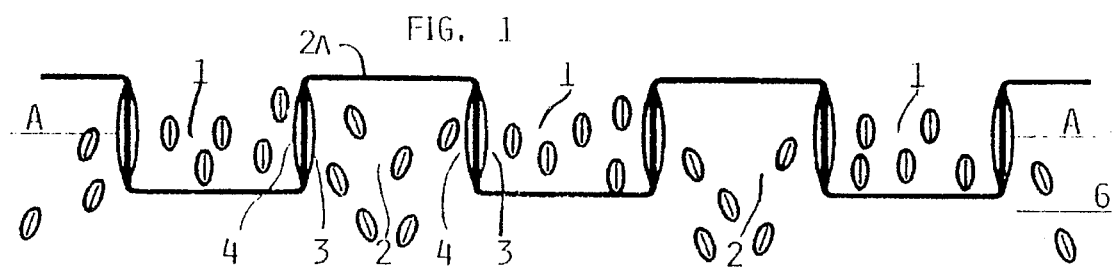
Figure 2:
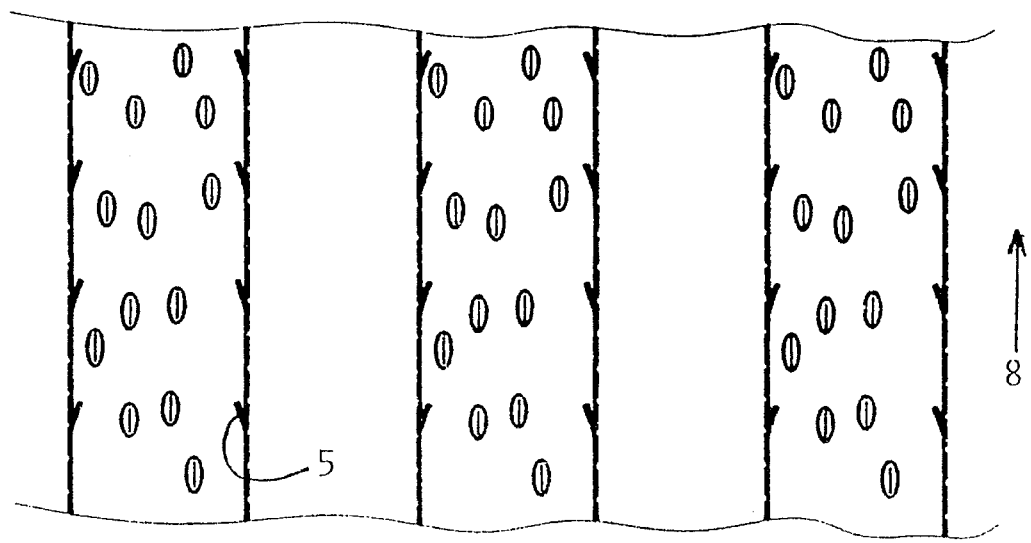
Figure 3:
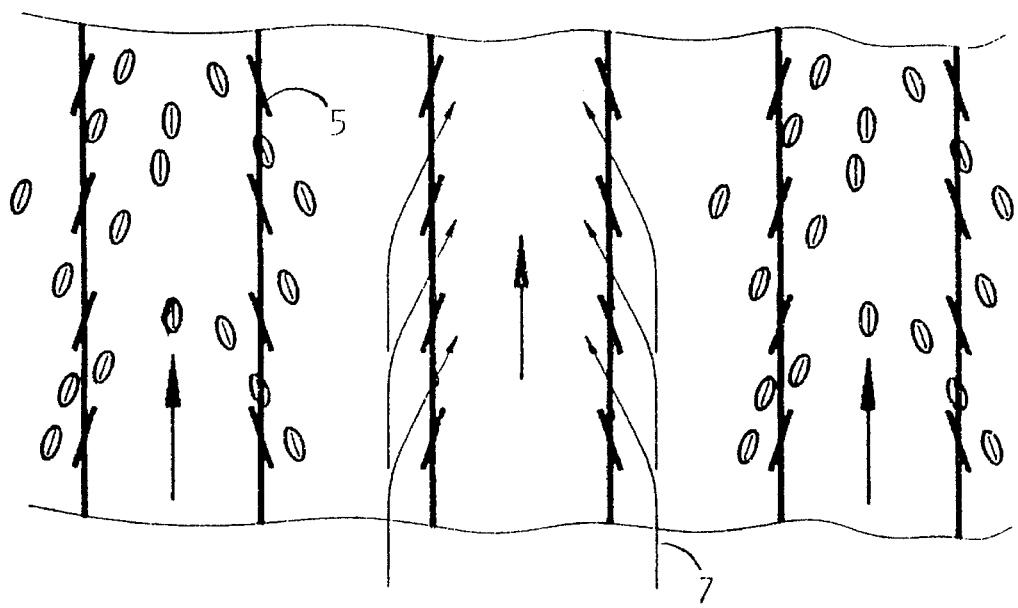
FIG. 3 is a cross sectional view along line A:A of FIG. 1.

The sieve according to the invention includes profile channels directed in parallel to the crop flow direction and thus also to the blower wind direction. The cross section of such a sieve is shown in FIG. 1 with grain grooves 1 and air passage channels 2 alternately arranged one next to the other.

The grain grooves are open on the top and the air passage channels are open on the bottom.

Between individual grain grooves 1 the wind channels 2, leg flanks 3 are provided. In these flanks, openings are provided through which, on one hand, the grains from grain grooves 1 pass into air channels 2 and, on the other hand, blower wind from air channels 2 passes into grain grooves 1. The openings in the leg flanks may be round, oval, square, rectangular or polygonal. Also a combination of individual shapes and sizes may be provided along a grain groove. In the graphical representation, the openings are shown for better understanding in the rectangular basic shape only.

The intermediate ribs 5 between the individual openings can, but need not necessarily, be disposed obliquely insofar, i.e. at a specific angle relative to the sieve plane 6, that the air current from the air channels 2 is "captured" and derouted into grain grooves 1 in crop flow direction 7.

The sieve itself is moved in accordance with the vibrating conveyor principle so that the harvested crop to be cleaned is conveyed into crop conveying direction 8.

The harvested crop to be cleaned is conveyed to the sieve surface. The air current exiting from the grain grooves now keeps the chaff particles afloat and hence on the "ribs" of the air channels 2. The specifically heavier grains, on the other hand, fall into grain grooves 1 and exit through openings 4 of leg flanks 3 into air channels 2 and hence onto the lower side of the sieve and then drop into a collector container.

Straw stalks, however, that have aligned in the crop conveying direction and hence offer only little resistance to the blower wind also drop into grain grooves 2. By the tight grooves, however, they are prevented from arranging themselves obliquely that far that they could also enter into the lateral openings 4. They are therefore quite naturally conveyed in the grain groove to the rear and out of the machine.

Figure 4:
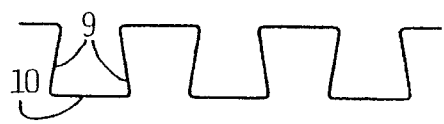
FIG. 4 is a shape of the channel of the sieve in cross section wherein the legs take an angle of less than 90° relative to the sieve plane.
Figure 5:
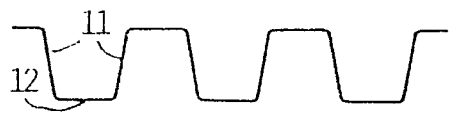
FIG. 5 is a shape of the channel of the sieve in cross section wherein the legs take an angle of more than 90° relative to the sieve plane.

Grain grooves 1 alternating with air channels 2 may include leg flanks 3 disposed at right angles relative to the sieve plane as well as leg flanks obliquely disposed at an amount relative to the sieve plane. Depending on the kind of crop and the operation conditions, such an embodiment may be of advantage. In FIG. 4, flanks 9 are profiled at an angle smaller than 90° relative to sieve plane 10 and in FIG. 5, flanks 11 are profiled at an angle greater than 90° relative to the sieve plane.

If in place of a sieve made from one piece, which sieve has for instance been made from a correspondingly profiled metal sheet plate, the sieve is assembled from individual channels, the most varying profile shapes can be selected.

Figure 6:
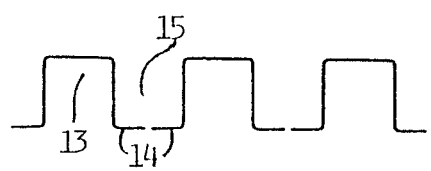
FIG. 6 is a sieve cross section wherein the sieve is assembled from individual profile parts.

In accordance with FIG. 6, air channels 13 consist of profile strips connected with the neighboring strips to constitute grain groove 15.

Figure 7:
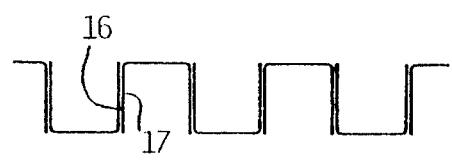
FIG. 7 is a sieve cross section wherein the sieve is assembled from individual U-shaped profiles.

A sieve structure according to FIG. 7 has proved to be particularly suitable. In this structure, U-shaped profiles are simply arranged one next to the other alternately with the bottoms showing upwards and downwards. The openings in legs 16 and 17 are congruently disposed next to each other.

This structure is also well suited for varying the size of the openings. If the individual channels are alternately shifted, the ribs between the individual openings of one leg move in front of the openings of the adjacent leg of the neighboring channel and, depending on the shift distance, more or less cover the openings. The sieves can in this way rapidly and without any problems be adapted to different kinds of crops while the sieve need not be changed.

Figure 9:
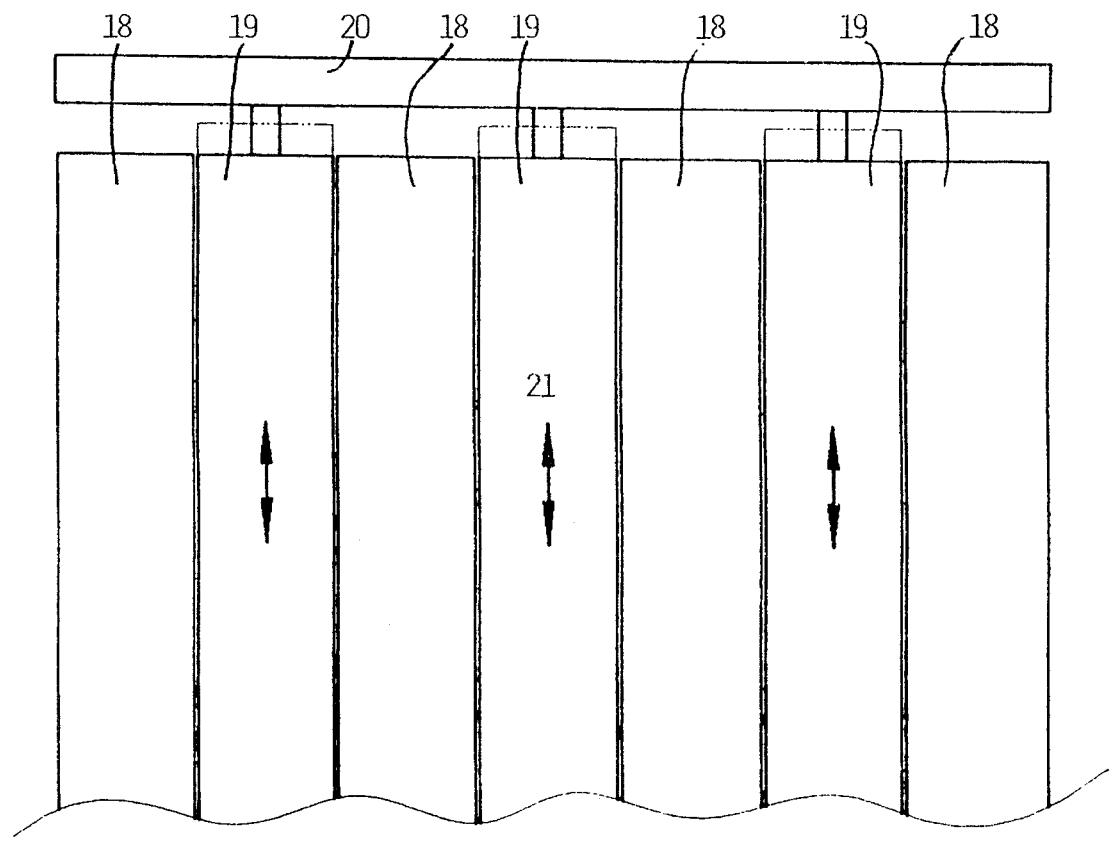
FIG. 9 is a topview of a sieve having profile channels shiftably arranged relative to each other.

In FIG. 9, an exemplified embodiment of such a displacement is shown. Channels 18 are solidly installed in a sieve frame not shown. Channels 19 intermediate thereof, however, are secured to a central crossbar 20. If the latter is moved in the direction of the arrow, channels 19 move relative to channels 18 as well.

Figure 10:
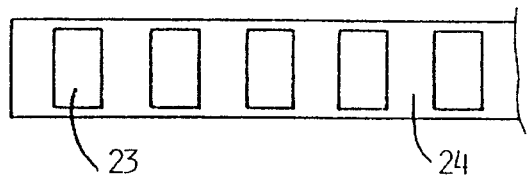
FIG. 10 is a longitudinal section through a channel having completely opened sieve passages in the legs.
Figure 11:
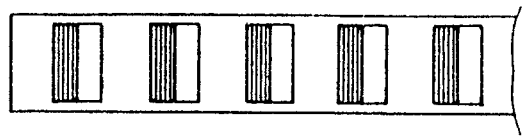
FIG. 11 is a longitudinal section according to FIG. 10 having partly closed sieve passages in the legs.

FIG. 10 shows the row of openings as apparent if the two legs 16 and 17 with the openings thereof are congruently lying side by side and in this way form the largest possible passage opening 23. (As mentioned further above, all possible shapes of passage openings are possible.) If now the movable channels are correspondingly shifted, the intermediate ribs 24 of one channel correspondingly mask the openings of the other channel and the passage is respectively reduced. In FIG. 11, for instance, a shift is shown, which reduces the openings for about one half.

Figure 8:
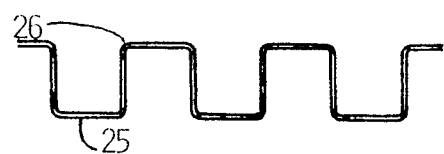
FIG. 8 is a sieve cross section wherein a second sieve bottom is provided above, or under, the first sieve bottom.

Such shifting possibility is of course also obvious in case of a sieve structure which has integrally been made from a plate of suited material, for instance a metal sheet plate. In FIG. 8, such a possibility has been depicted. In this case, two correspondingly profiled plates are simply arranged one upon the other. The lower profile plate 25 is solidly secured to the sieve frame not shown, and the profile plate 26 disposed thereabove is movably disposed on a shifter mechanism not shown. If now the upper plate is shifted, the openings and ribs, respectively, in the leg flanks move as well and reduce or enlarge, respectively, the passage of the openings.

Figure 12:
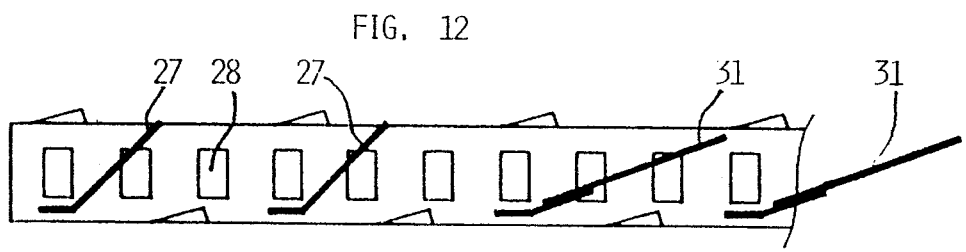
FIG. 12 is a longitudinal section B:B through a grain groove closed on the bottom including derouting baffles and air nozzles.
Figure 13:
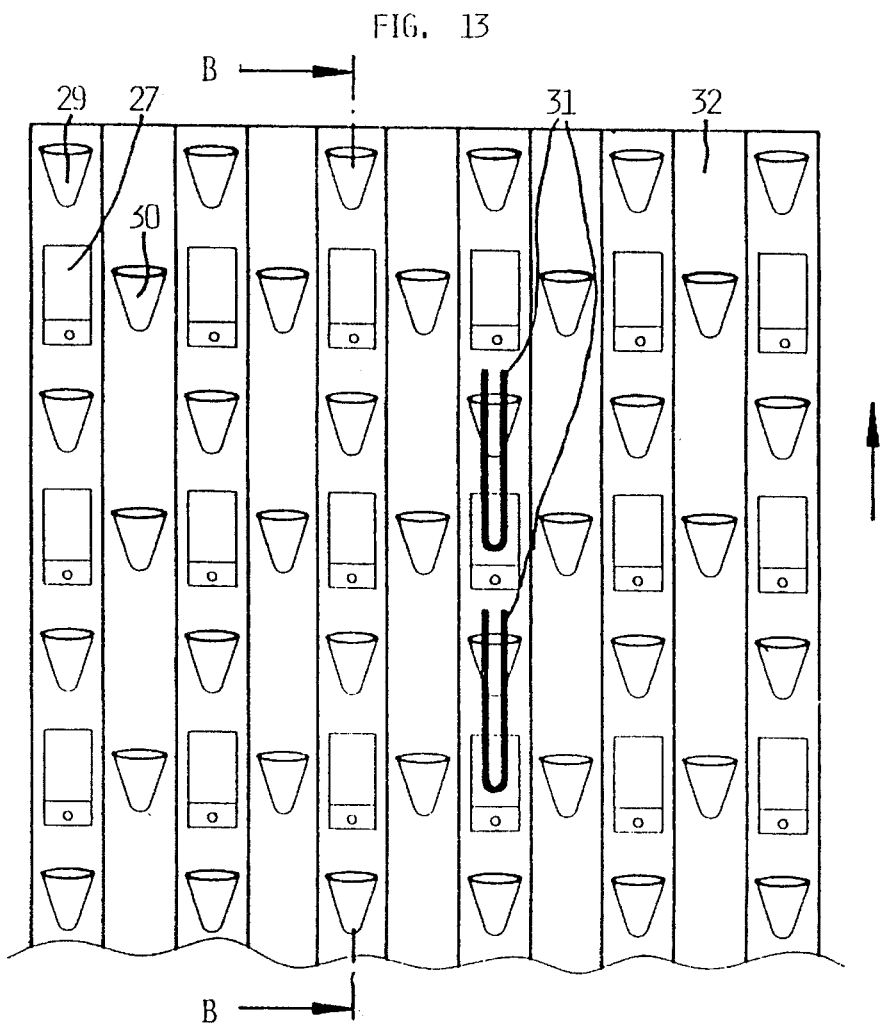
FIG. 13 is a topview on a sieve according to the invention.

Since the grain grooves are continuously open, it might happen that the grains are pushed too fast by the wind current through the grooves and pack up at the end of the sieve. The grains have not, in this case, sufficient opportunity to pass through the lateral openings. This might particularly happen when the machine is travelling up-hill. In order to avoid such packing up, baffle plates 27, FIGS. 12 and 13, tilted in the direction of the crop conveying direction are provided in the grain grooves. These obliquely disposed baffle plates do not only constitute a back-holding deceleration means for the grains but also deroute the wind current exiting from the lateral openings 28 upwardly and to the rear. This wind current directed obliquely upwardly pushes thereby the lighter chaff and straw particles upwardly and rearwardly. These baffle plates 27 may be provided in most different heights in the grain grooves. It might also be suitable to leave them project in height above the profile rib of the air channels.

In order to disintegrate, on the other hand, the grains in the grain grooves and to push the chaff particles still embedded in the grain flow upwardly, additional air slots 29 may be punched into the groove bottom, and for conveying chaff and straw particles gliding above the profile ribs of the air channels, similar air slots 30 may also be provided in the profile ribs of the air channels.

In place of, or in combination with, baffle plates 27, spring dovetails 31 installed as slightly obliquely ascending to the rear in the grain grooves can add to the disintegration of the crop. Spring bars 31 depicted in FIGS. 12 and 13 have for reasons of clarity been shown in a partial area of the sieve only. It is obvious that their number can be distributed over the whole area of the total sieve surface. Such spring dovetails 32 may also be installed on the profile ribs of the air channels 30.

We claim:

1. Sieve for separating grain crops from a chaff-straw mixture which is passed by a blower wind current from below and which comprises grooves (1) and channels (2) alternating with each other, said grooves and channels being elongated in a crop conveying direction and being aligned in parallel to the crop conveying direction, said grooves and channels being alternately open on the top and open on the bottom and having lateral legs (3) separating said grooves (1) from said channels (2), said lateral legs having openings (4) through which the harvested crop can pass from the grooves (1) open on top to the channels (2) open on the bottom.

2. Sieve according to claim 1, wherein said openings in said legs (3) are of a shape selected from the group consisting of round, oval, square, rectangular and polygonal.

3. Sieve according to claim 1, wherein intermediate ribs (5) separating said openings (4) in each lateral leg from one another are provided at an angle relative to a direction of elongation of said channels and grooves.

4. Sieve according to claim 1, wherein said lateral legs (3) of said channels are perpendicular to a sieve plane (6).

5. Sieve according to claim 1, wherein said lateral legs (9) of said grooves (1) or said channels (2) are arranged at an angle smaller than 90° to a sieve plane (10).

6. Sieve according to claim 1, wherein one leg (11) (FIG. 5) of each said groove (1) or said channel (2) is arranged at an angle greater than 90° relative to a sieve plane (12).

7. Sieve according to claim 1, wherein the sieve is made of an integral plate-shaped material into which individual grooves (1) and channels (2), respectively, are profiled.

8. Sieve according to claim 1, wherein the sieve is assembled of individual elongated profile parts.

9. Sieve according to claim 1, wherein the sieve is assembled of individual U-shaped profile parts.

10. Sieve according to claim 1, further comprising an additional sieve profiled and punched correspondingly to the sieve and which is provided above or below the sieve and is adjustable relative to said sieve in a direction of elongation of said grooves and channels.

11. Sieve according to claim 1, wherein each channel is adjustable relative to the neighboring groove (18) in a direction parallel to the direction of elongation of the channel.

12. Sieve according to claim 11, wherein each adjustable channel (19) is connected to a central shifter mechanism (20) for adjusting the channel in said direction of elongation.

13. Sieve according to claim 1, wherein the grooves (1) have baffle plates (27) open on the top and inclined obliquely in the crop conveying direction.

14. Sieve according to claim 13, wherein said baffle plates (27) are provided at different heights and/or different angles relative to a sieve plane (6).

15. Sieve according to claim 1, wherein air outlet slots (29) are provided in the bottoms of the grooves (1) open on the top.

16. Sieve according to claim 1, wherein air outlet slots (30) are provided in a U-shaped rib of the channels (2) open on the bottom.

17. Sieve according to claim 15, wherein said air outlet slots (29) are nose-shaped and have openings open in the crop conveying direction.

18. Sieve according to claim 1, wherein spring bars (31) are provided in said grooves open on the top.

19. Sieve according to claim 16, wherein spring dovetails (32) are provided on the rib at the air outlet slots open on the bottom.

20. Sieve according to claim 16, wherein said air outlet slots (30) are nose-shaped and have openings which are open in the crop conveying direction.

21. Sieve according to claim 1, wherein a wall defining the bottom of each groove and the top of each channel extends parallel to a sieve plane.

* * * * *